No. 863,814. PATENTED AUG. 20, 1907.
L. E. UNDERWOOD.
DYNAMO ELECTRIC MACHINE.
APPLICATION FILED APR. 9, 1904.

2 SHEETS—SHEET 1.

WITNESSES:
George H. Thornton
Helen Oxford

INVENTOR:
Louis E. Underwood,
By Albert S. Davis
Att'y.

No. 863,814. PATENTED AUG. 20, 1907.
L. E. UNDERWOOD.
DYNAMO ELECTRIC MACHINE.
APPLICATION FILED APR. 9, 1904.

2 SHEETS—SHEET 2.

WITNESSES:

INVENTOR:
Louis E. Underwood,
By Albert G. Davis
Att'y.

UNITED STATES PATENT OFFICE.

LOUIS E. UNDERWOOD, OF LYNN, MASSACHUSETTS, ASSIGNOR TO GENERAL ELECTRIC COMPANY, A CORPORATION OF NEW YORK.

DYNAMO-ELECTRIC MACHINE.

No. 863,814.  Specification of Letters Patent.  Patented Aug. 20, 1907.

Application filed April 9, 1904. Serial No. 202,380.

*To all whom it may concern:*

Be it known that I, LOUIS E. UNDERWOOD, a citizen of the United States, residing at Lynn, in the county of Essex and State of Massachusetts, have invented certain new and useful Improvements in Dynamo-Electric Machines, of which the following is a specification.

In the operation of dynamo-electric machines difficulties are frequently experienced from the rise in temperature of various parts of the machines resulting from the conditions of use. This is particularly true of machines the moving parts of which are inclosed more or less completely to protect them from dust or moisture.

The object of my present invention is the provision of simple and efficient cooling means which can be readily applied to inclosed or open-ended dynamo-electric machines.

In carrying out my invention I arrange a conduit or system of conduits in proximity to the parts to be cooled and preferably in the idle spaces within the machine proper, and provide means for maintaining the flow of a cooling fluid through such conduits.

The various features of novelty which characterize my invention are pointed out with particularity in the claims annexed to and forming a part of this specification.

For a better understanding of my invention, however, reference may be had to the accompanying drawings in which I have illustrated and described one embodiment of my invention.

Figure 1:
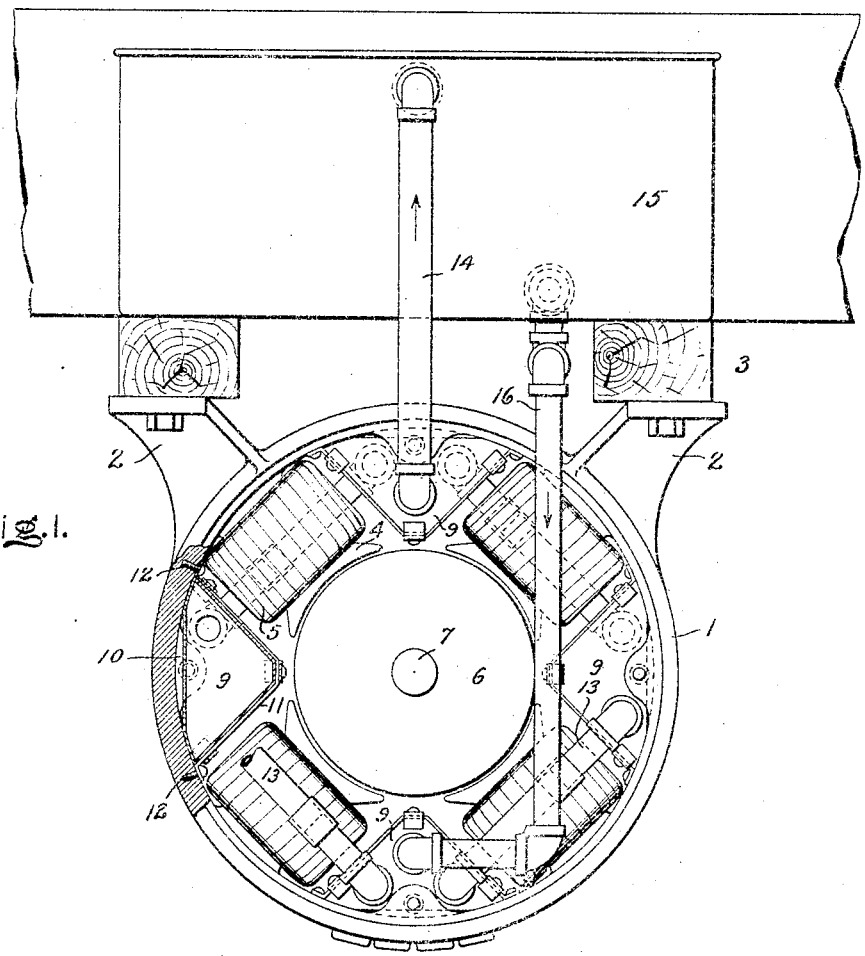
Figure 2:
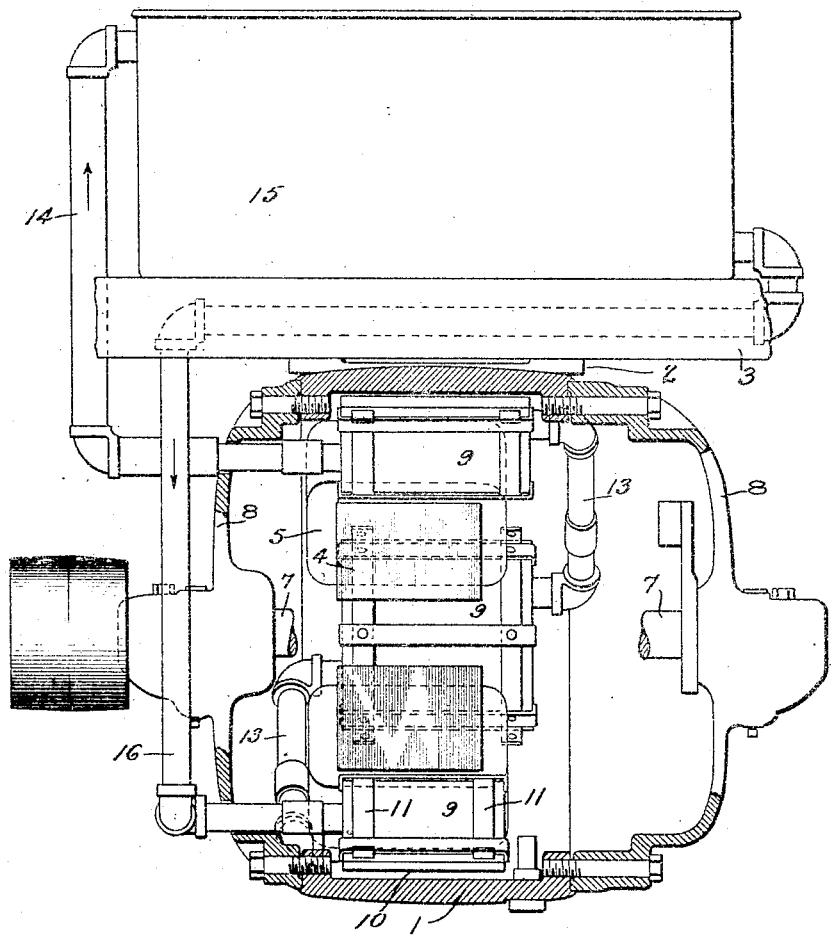

In the drawings, Figure 1 is an end elevation of an inclosed motor having the front end plate removed with a portion in section, and Fig. 2 is a side elevation with a portion of the motor frame in section and with the armature shaft broken away and the armature removed.

Referring to the drawings, 1 represents the cylindrical frame of an inclosed motor provided with projections or feet 2 which are secured to overhead wooden beams or bars 3. Polar projections 4 extend inwardly from the inner periphery of the frame 1. Each of the polar projections is surrounded by a magnetizing coil 5. The armature 6 of the motor has its shaft 7 supported in bearings carried by movable end plates or members 8. It will be observed that the frame 1 and end pieces 8 form a casing which completely incloses the armature 6, brushes, commutator or collector rings, etc. I have not thought it necessary to show the brushes or commutator or collector rings in the drawings.

Between each pair of adjacent field coils 5 is located a conduit, tank, or receptacle 9. Each tank, which is preferably formed of sheet metal, is substantially triangular in cross-section, as is clearly shown in Fig. 1, and is shaped to substantially fill the space between adjacent field coils 5 and the inner periphery of the frame 1. I prefer to form the portion of the tank next the frame as shown in Fig. 1 so that a ventilating space 10 will exist between the body of the tank and the inner periphery of the frame. The tanks are detachably secured in place by means of bent metal straps 11 which are secured at their ends to the frame 1 by screws 12. Suitable conduits, pipes, or piping 13, which comprises pipe sections, elbows and couplings, are employed to connect each tank to the adjacent tank at each side. A pipe or piping 14 connects the upper tank or receptacle 9 to a reservoir 15 located above and carried by the bars or beams 3, and a pipe or piping 16 connects the lower portion of the reservoir 15 with the lower tank or receptacle 9. As is clearly shown in Fig. 2 of the drawing, the pipes 14 and 16, which are so shaped as to lead from opposite sides of the reservoir 15, pass through apertures formed for the purpose in the left-hand end plate 8. The tank 9 and the pipes and the reservoir 15 are filled with a suitable cooling fluid such as water.

As the interior of the chamber formed by the frame 1 and end plates 8 becomes heated the water in the tanks 9 will take up some of the heat and a gravity flow of the water will be established through the system comprising the tanks 9, pipes and reservoir, in the direction indicated by the arrows. As a result of this circulation the colder water from the lower portion of the tank 15 will be passed continually into the tanks 9 while the warmer water from tanks 9 will be passed to the upper end of the reservoir.

The various parts of the motor may be constructed so that the rotation of the armature will produce an advantageous air circulation within the casing inclosing the moving parts of the motor whereby the entire interior of the casing may be cooled by the water in the tanks and pipes within the casing. In order to obtain a better circulation of water through the system the pipe 16 may be lagged up or incased in some suitable material which is a poor conductor of heat.

The construction which I have illustrated in the drawings is efficient, compact and comparatively inexpensive. It will be understood, however, that many changes may be made in the form of my invention without departing from its spirit.

What I claim as new and desire to secure by Letters Patent of the United States, is,

1. In a dynamo-electric machine, a frame, polar projections extending therefrom, and sheet metal tanks or receptacles located in the spaces between adjacent polar projections.

2. In a dynamo-electric machine, a frame, polar projections extending therefrom, sheet metal tanks or receptacles located in the spaces between adjacent polar projections, and means for causing a cooling agent to flow through said tanks.

3. In a dynamo-electric machine, a field ring provided with internally-extending polar projections, and triangular sheet metal tanks located in the spaces between adjacent projections.

4. In a dynamo-electric machine, a field ring provided with internally-extending polar projections, triangular sheet metal tanks located in the spaces between adjacent projections, and means for securing said tanks in place comprising one or more bent straps which embrace said tanks, the ends of said straps being secured to said ring.

5. In combination, the field ring of a dynamo-electric machine, said field ring being provided with internal polar projections, inclosing plates or members engaging the ends of said field ring, sheet metal tanks located in the spaces between adjacent polar projections, pipe connections between adjacent tanks, a reservoir external to said field ring, and pipe connections extending from the upper portion of said reservoir to one of said tanks and from the lower portion of said reservoir to another of said tanks.

6. In a dynamo-electric machine, a field ring provided with internally-extending polar projections, and cooling tanks removably secured in the spaces between adjacent projections.

7. In a dynamo-electric machine, a field ring provided with internally-extending polar projections, cooling tanks located in the spaces between said projections, and means for detachably securing the tanks in position, comprising straps, the ends of which are secured to the ring.

8. In a dynamo-electric machine, a frame, polar projections extending therefrom, and cooling tanks or receptacles detachably secured in the spaces between adjacent polar projections.

9. In an inclosed dynamo-electric machine, comprising a field ring and end plates, one at least of said end plates being apertured, cooling tanks located in the spaces between polar projections from said field ring, pipe connections between adjacent tanks, and pipe connections from two of said tanks extending through the end piece apertures.

10. In a dynamo-electric machine, a frame, polar projections extending therefrom, and cooling tanks or receptacles secured in the spaces between adjacent polar projections.

11. In a dynamo electric machine, a frame, polar projections extending therefrom, windings therefor, a receptacle or receptacles through which a cooling fluid may flow detachably secured in the spaces between said windings, said receptacle or receptacles being insulated from the winding, and conduits leading to said receptacle or receptacles for supplying a cooling fluid thereto.

12. In a dynamo-electric machine, a rotating member comprising core and conductor parts, a stationary member comprising core and conductor parts and a casing inclosing said rotating member, receptacles detachably mounted within said casing in the idle spaces therein, and means for causing a cooling fluid to flow through said receptacles whereby air currents set in motion by the rotation of said rotating member cause heat to be transmitted to said fluid from said core and conductor parts.

In witness whereof, I have hereunto set my hand this seventh day of April, 1904.

LOUIS E. UNDERWOOD.

Witnesses:
DUGALD McK. McKILLOP,
HENRY S. BALDWIN.